Oct. 10, 1967    W. B. HOLDRIDGE    3,345,893
RADII CUTTER
Filed June 14, 1965    2 Sheets-Sheet 1
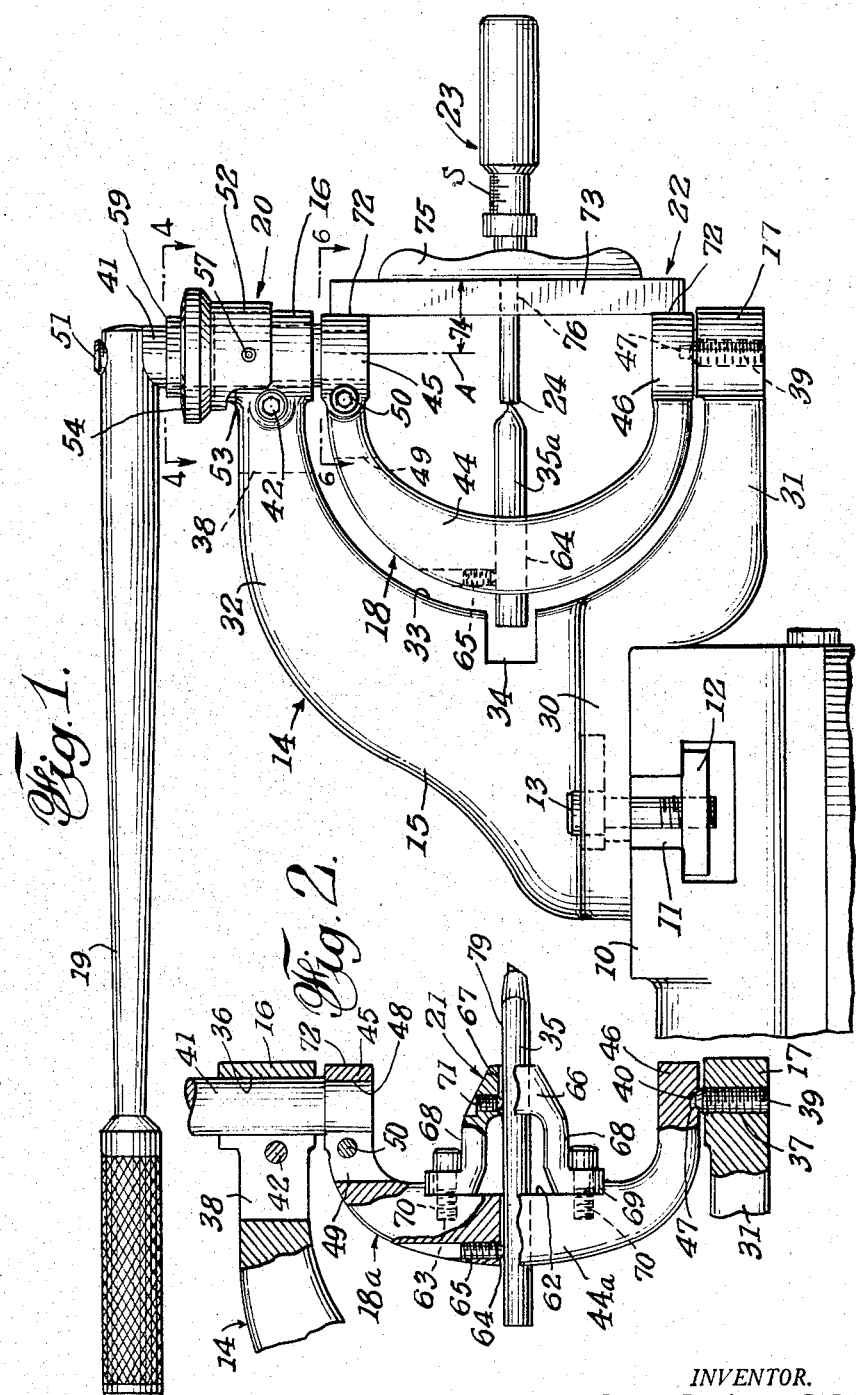
INVENTOR.
WARREN B. HOLDRIDGE
BY C. G. Stratton
ATTORNEY Oct. 10, 1967 — W. B. HOLDRIDGE — 3,345,893
RADII CUTTER
Filed June 14, 1965 — 2 Sheets-Sheet 2
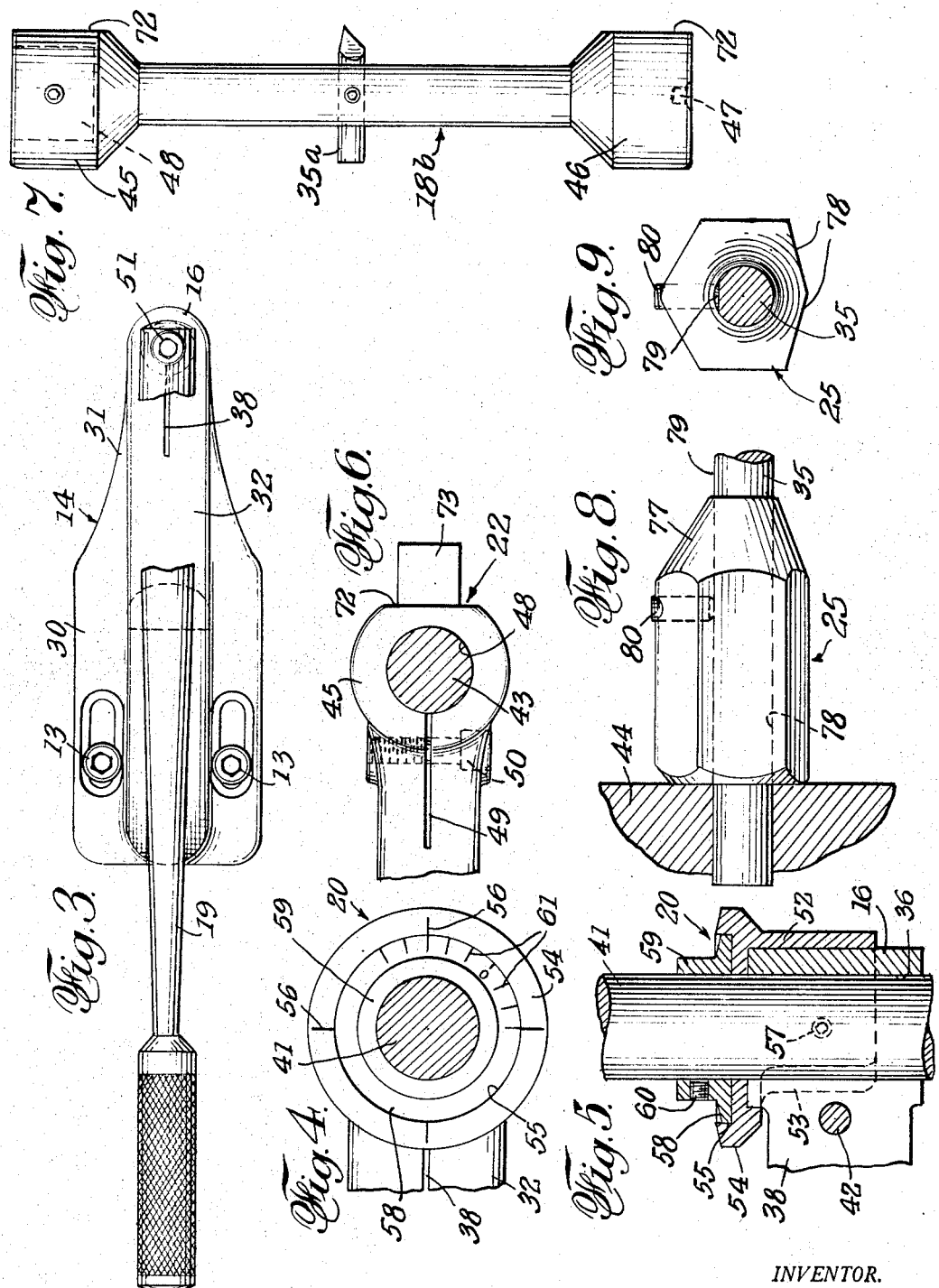
INVENTOR.
WARREN B. HOLDRIDGE
BY C. G. Stratton
ATTORNEY či# 3,345,893
RADII CUTTER
Warren B. Holdridge, Los Angeles, Calif.
(116 W. 154th St., Gardena, Calif. 90247)
Filed June 14, 1965, Ser. No. 463,780
1 Claim. (Cl. 82—12)

The present invention relates to a tool and method for cutting radii on rotating workpieces, the same, thereby, being adapted to cut annular half-round grooves in the peripheries of round members, semi-spherical concavities, semi-spherical as well as ball ends on round stock, and other such shapes that are formed by radii cuts.

An object of the present invention is to provide a method for accurately measuring the position of the point of the cutter or bit of a radii cutter, thereby greatly facilitating setup, and for providing novel and improved means for carrying out said method.

Another object of the invention is to provide a radii cutter, as characterized above, with means measuring the angular range cut by the tool bit.

A further object is to provide a radii cutter with bit-steadying means, thereby enabling use of bits having long shanks with accuracy of their cuts.

A still further object of this invention is to provide a radii cutter in which frame thereof is adapted to interchangeably mount C-yokes and straight spindles and is provided with quick lock means that facilitates effecting such interchangeability.

This invention also has for its objects to provide such means that are positive in operation, convenient in use, easily installed in a working position and easily disconnected therefrom, economical of manufacture, relatively simple, and of general superiority and serviceability.

The above enumerated objects of the invention are realized in a device that comprises a frame that is adapted to be mounted on the compound rest of a lathe or similar machine, a plurality of interchangeable members comprising both C-yokes and straight spindles for mounting tool bits of different sizes and for various types of cutting operations, simple mounting, dismounting and locking means being provided to so inter-connect a selected C-yoke or spindle with the frame that said yokes or spindles are rotational on a preferably vertical axis, causing the cutting end of bit thereof to turn around said axis, and providing means that locates a micrometer depth gauge so the spindle thereof, when adjusted to the desired gauging distance, locates the cutting point of a tool bit on the yoke or spindle which carries it so the same describes measured arcuate cutting paths that are convex or concave, according to the disposition of said cutting point in relation to the axis on which a handle turns said bit-provided yoke or spindle. Calibrated dial means may be mounted with a fixed part thereof on the frame and a rotational part on the spindle so that the angle included in the sweep of the bit point may be measured.

The mentioned means that locates a depth gauge is simply comprised of a gauge bar of a known thickness and aligned faces on the mounting bosses of the C-yokes and straight spindles against which said bar is adapted to be positioned, with a micrometer depth gauge adapted to be applied to said bar with its measuring spindle extending through a hole in said gauge bar. The distance from the axis of rotation of said yokes or straight spindles to the mentioned aligned faces is also known. Thus, the frame of the depth gauge is spaced from the rotation axis a known distance and reading of the micrometer setting is rendered simple.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

In the drawings, like reference characters designate similar parts in the several views.

FIG. 1 is a side elevational view of a radii cutter according to the present invention, the same showing one form of C-yoke and the manner of gauging the desired position of the cutting end of the tool bit mounted on said yoke.

FIG. 2 is a fragmentary and partly sectional view of a modification that is provided with another form of C-yoke and with a support for bits that have long extension from said yoke.

FIG. 3 is a plan view of the radii cutter shown in FIG. 1, dial means shown in the latter view being omitted.

FIG. 4 is an enlarged cross-sectional view as taken on line 4—4 of FIG. 3, showing the dial means in plan.

FIG. 5 is a vertical sectional view taken through the center of FIG. 4.

FIG. 6 is a cross-sectional detail view as taken on the line 6—6 of FIG. 1.

FIG. 7 is an elevational view of one form of straight bit-mounting spindle that is interchangeable with the C-yokes of FIGS. 1 and 2.

FIG. 8 is a side view of a fixture that may be applied to a bit in a C-yoke or straight spindle for guiding the rake angle on which the bit is ground.

FIG. 9 is an end view of said fixture.

FIG. 1 shows a conventional compound rest 10 having the usual key slot 11 for a tie-down plate 12 which, by means of cap screws 13, fixedly secures the present radii cutter 14 in operative position with respect to a workpiece mounted to turn on a horizontal axis as in a lathe, for instance.

The present radii cutter 14 is shown as a frame 15 having vertically spaced and axially aligned mounting bosses 16 and 17, tool bit-mounting members 18 (FIG. 1), 18a (FIG. 2), and 18b (FIG. 7) mounted for rotational movement around the axis on which the bosses 16 and 17 are aligned, a handle 19 for turning said members 18, 18a and 18b about said axis, dial means 20 for reading the angle of movement of the member 18, 18a or 18b, as the case may be, about said axis, a bit support 21 to steady the cutting operation of a bit that has substantial longitudinal projection from the member mounting it, means 22 for locating a micrometer depth gauge 23 so that the end of the spindle 24 thereof accurately positions the cutting end of a bit to describe the desired radius of its cut, and a fixture 25 for guiding the sharpening or grinding of a bit to insure proper rake angles thereon.

The frame 15 is strongly formed to have a base portion 30 that is adapted to rest upon a compound rest 10 when secured thereto, as above explained, a lower forward extension 31 terminating in the boss 17 and an upwardly and forwardly directed body portion 32 that terminates in the boss 16. The latter portion is formed with an arcuate concavity 33 that is approximately semi-circular, a clearance notch 34 being provided in the concave side of the body portion about mid way between the bosses 16 and 17, the same providing clearance for the mounting end of a bit 35 carried by a C-yoke 18, as in FIG. 1, for instance. The boss 16 is shown as having a smooth bore 36 which is on the axis on which the yoke is swingable, and the boss 17 is shown with a threaded bore 37 that is on said axis. A slit 38 extends from said bore 36 laterally part way along the body portion 32. A pivot screw 39 having a cylindrical pilot end 40 is fitted in said threaded bore 37. Said end 40 is directed toward the boss 16. A spindle 41 is fitted in the bore 36 of said boss 16 and is frictionally clamped by contraction of the wall of said bore by a cap screw 42 that draws the walls of slit 38 together. The degree of friction applied varies the tightness that grips spindle 41. Said spindle preferably is formed with a reduced end 43 that extends toward the boss 17.

The bit-mounting member 18, as shown in FIG. 1, has a C-shaped body 44 having respective upper and lower ends that terminate as an upper boss 45 and a lower boss 46. This member will be called a C-yoke hereinafter. The boss 46, in its lower surface, is provided with a seat 47 into which the pilot end 40 is entered to effect a rotational engagement between the lower portions of the frame 15 and the C-yoke 44. The boss 45 is provided with a bore 48 that is aligned with the cylindrical seat 47 and into which the cylindrical spindle extension 43 is fitted. A slit 49, similar ot the slit 38 and a slit-closing cap screw 50 are provided for contracting the bore 48 around the spindle end 43 to effect a tight fit of the C-yoke 18 on the spindle 41.

The handle 19 is formed as a long member that is affixed, as by a cap screw 51 to the upper end of the spindle 41, the length of said handle enables application of manually applied force to turn the C-yoke 18 on the axis on which the pivot screw 39 and the spindle 41 are aligned. The handle is preferably separable from said spindle by merely removing said cap screw 51, thereby exposing the end of said spindle so that the dial means 20 may be applied without dismounting the C-yoke 18 and thereby disturbing the position of a bit 35 carried thereby.

The dial means 20 is shown as comprising a tubular body 52 that is fitted over the boss 16 and is open at 53 to accommodate the body portion 32 of the frame 15. The upper end of said body 52 has an enlargement 54 in which a circular seat 55 is formed. One or more index marks 56 are provided on the upper, preferably flatly conical face of said enlargement. One or more set screws 57 may be used for separably affixing said body 52 to the boss 16.

The mentioned seat 55 is occupied by a disc 58 formed with a collar 59 that, by means of a set screw 60 is affixed to the spindle 41 so that said disc is rotatable with the spindle. The top face of said disc is provided with a protractor scale 61 which is readable in connection with the index marks 56 to show the angle of movement of the C-yoke 18 around its mounting axis.

The member 18a, shown in FIG. 2, has a modified C-shape in that the body 44a is shallower than the body 44 of C-yoke 18. The member 18a is also a C-yoke, as can be seen, but has a smaller radius of swing around its axis than has the C-yoke 18. The inner side of said body 44a is provided with a flatly machined face 62 in which blind taps 63 are located on opposite sides of the bit-accommodating bore 64.

In cases where the set screw 65 for affixing the bit to the C-yoke is not sufficient to steady the latter, a condition that may be due to an elongated extension of the bit end, as in FIG. 2, the bit support 21 may be used. The same is generally U-shaped, having a central body 66 with a bore 67 through which the bit extends, rearwardly directed legs 68 on opposite sides of said body 66, and outwardly turned feet 69 that engage the face 62 of the C-yoke and are fastened thereto by cap screws 70 that engage in the taps 63. A set screw 71 in the body 66 of the support 21 cooperates with the set screw 65 to provide a longitudinally spaced two-point support for the bit 35.

The modification of FIG. 2 omits the dial means 20 but the same may be applied, as above described.

The means 22 is shown as comprising coplanar flat surfaces 72 that are machined in the forward portions of the bosses 45 and 46 of both the C-yokes 18 and 18a and the straight spindle 18b that is shown in FIG. 7, and a preferably square bar 73 that is longer than the distance between said bosses and is adapted to be applied flatly against the surfaces 72. In practice, the distance between the axis of rotation of the C-yokes and straight spindle and the faces 72 has a fixed, known value. The thickness of bar 73 is also known. The sum of these dimensions, therefore, has a fixed value 74, shown in FIG. 1. By applying a conventional micrometer depth gauge 23 with its body 75 in contact with the front face of the bar 73, and its spindle 24 extending through a clearance hole 76 in said bar, the position of the end of said spindle can be found, the same being the difference between the reading on the micrometer scale S on the sleeve of said gauge and the value of dimension 74. By setting the point of the bit 35 against the end of the gauge spindle 24 and tightening the set screw 65, the bit will be located to describe a desired radius. By interposing blocks of known size between the bar 73 and the surfaces 72, the value of dimension 74 is increased accordingly and the location of bits with their cutting ends on the opposite side of the axis A may be measured as before. It wlil be clear that said bar 73 and/or the mentioned blocks constitute portions that serve as part of the micrometer body 75.

The fixture 25 is shown as a hexagonal bar with a tapered end 77 having a through bore 78 for a tool bit 35. Said bar is formed to have two oppositely angled surfaces 78, in this case, 20°, to guide grinding the proper rake angles on the bits. Since the bits are provided with longitudinal flats 79 and these flats are engaged by the set screws 65 and 71, the tool is always radially oriented with relation to a workpiece on which it operates. By securing said fixture 25 to the bit by a set screw 80 that also engages said flat 79, the surfaces 78 guide proper rake angle grinding.

With a short bit 35 carried by C-yoke 18, a ball may be machined on the end of a rotating piece of stock. If a neck is to be formed for said ball, a straight spindle 18b may be used. The C-yoke 18 with a bit extending beyond the axis A may be used to form a cup-shaped socket. Such a bit would have a conventional offset. Torus-shaped items having a convex internal radius may be formed, it only being necessary to select the yoke 18, 18a or 18b, the size, length and type of bit, and using the means 22 to locate the bit point to cut the desired radius on a rotating workpiece.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claim.

Having thus described this invention, what is claimed and desired to be secured by Letters Patent is:

In a radii cutter having a member with a transverse hole through which a bit is adapted to extend and manually movable about an axis so the cutting end of the bit describes an arcuate cutting path according to the distance of said end from said axis,
  (a) a support member affixed to the bit mounting member and having a hole aligned with the latter member and through which the bit is adapted to extend, and
  (b) two set screws to replaceably affix said bit, one set screw being carried by the bit mounting member and bisecting the hole therein and adapted to engage one end of the bit, and the other set screw being carried by the support member and bisecting the hole therein and adapted to engage a longitudinally spaced portion of the bit.

References Cited

UNITED STATES PATENTS

| | | | |
|---|---|---|---|
| 2,295,014 | 9/1942 | Schmuldt | 82—12 |
| 2,452,757 | 11/1948 | Holdridge | 82—12 |
| 2,716,913 | 9/1955 | Leerkamp | 82—12 |
| 2,828,658 | 4/1958 | Algatt et al. | 82—12 |

OTHER REFERENCES

Popular Science, vol. 141, No. 2, August 1942, pp. HW160, HW161.

WILLIAM W. DYER, JR., *Primary Examiner.*

LEONIDAS VLACHOS, *Examiner.*